(12) United States Patent
Fukuda et al.

(10) Patent No.: US 11,665,590 B2
(45) Date of Patent: May 30, 2023

(54) DATA COMMUNICATION METHOD, HUB STATION, AND EARTH STATION

(71) Applicant: Mitsubishi Electric Corporation, Chiyoda-ku (JP)

(72) Inventors: Kazunobu Fukuda, Chiyoda-ku (JP); Makiko Hiragi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 17/042,568

(22) PCT Filed: Jan. 23, 2019

(86) PCT No.: PCT/JP2019/002031
§ 371 (c)(1),
(2) Date: Sep. 28, 2020

(87) PCT Pub. No.: WO2019/193814
PCT Pub. Date: Oct. 10, 2019

(65) Prior Publication Data
US 2021/0144586 A1 May 13, 2021

(30) Foreign Application Priority Data
Apr. 4, 2018 (JP) .............................. JP2018-072492

(51) Int. Cl.
*H04W 28/06* (2009.01)
*H04B 7/185* (2006.01)
*H04L 45/00* (2022.01)

(52) U.S. Cl.
CPC ...... *H04W 28/065* (2013.01); *H04B 7/18517* (2013.01); *H04B 7/18584* (2013.01); *H04L 45/66* (2013.01)

(58) Field of Classification Search
CPC ............................ H04W 28/06; H04W 28/065
See application file for complete search history.

(56) References Cited

U.S. PATENT DOCUMENTS

| 4,706,081 A | 11/1987 | Hart et al. |
| 9,735,859 B1* | 8/2017 | Snyder ............... H04B 7/18517 |
| 2005/0147111 A1* | 7/2005 | Moleyar ................. H04L 61/00 |
| | | 370/412 |

FOREIGN PATENT DOCUMENTS

| JP | 4-207822 A | 7/1992 |
| JP | 6-91537 B2 | 11/1994 |

(Continued)

OTHER PUBLICATIONS

International Search Report dated Mar. 19, 2019 in PCT/JP2019/002031 filed on Jan. 23, 2019, 1 page.

(Continued)

*Primary Examiner* — Sulaiman Nooristany
(74) *Attorney, Agent, or Firm* — Oblon, McClelland, Maier & Neustadt, L.L.P.

(57) ABSTRACT

One earth station transmits an address of a source to another earth station (or HUB station), and the other earth station (or HUB station) stores the address in an address management table in association with the one earth station that has transmitted the address of the source and reads, from destination packet data that is packet data including an address of a destination, the address of the destination, and the other earth station (or HUB station) transmits the destination packet data to the associated earth station with reference to the address management table.

13 Claims, 7 Drawing Sheets

(56) References Cited

FOREIGN PATENT DOCUMENTS

JP     2002-57720 A      2/2002
JP     2007-208630 A     8/2007

OTHER PUBLICATIONS

Harada, K. et al., "A Study for Fixed Wireless Access Systems with CUG Function," Proceedings of the 2001 IEICE General Conference, B-5-316, 2001, p. 714.
Notice of Reasons for Refusal dated Mar. 31, 2020 in Japanese Patent Application No. 2020-511610 (with unedited computer-generated English translation), 9 pages.
Notice of Reasons for Refusal dated Sep. 2, 2020 in Japanese Patent Application No. 2020-511610 (with unedited computer-generated English translation), 8 pages.
Combined Chinese Office Action and Search Report dated Aug. 11, 2021 in Chinese Patent Application No. 201980023253.1 (with English translation), 21 pages.

* cited by examiner

FIG.5

DATA COMMUNICATION METHOD, HUB STATION, AND EARTH STATION

TECHNICAL FIELD

The present disclosure relates to a data communication method, a HUB station, and an earth station that perform packet data communications in the same subnet (layer 2 network) over a communication channel via a satellite.

BACKGROUND ART

In a conventional packet-switching transmission system, packet data communications (packet communications) are performed via a HUB station over a communication channel via a satellite (e.g., see FIG. 6 of PTL 1 or PTL 2). PTL 2 describes a system in which one-to-N connection is performed by a single channel per carrier (SCPC) modem for higher efficiency of communications between earth stations through full mesh connection. In typical packet data communications handled in common LAN communications, destination control is performed by a L2 address, such as a media access control (MAC) address, and accordingly, transfer control is based on similar data (L2 address) performed also in communications over a satellite channel, leading to a high-compatibility implementation system.

Satellite communication systems also include a demand assignment multiple access (DAMA) system (e.g., see PTL 3). In the DAMA satellite communication system, a control station allocates channels of earth stations, and the earth stations (transmitting stations or receiving stations) with the allocated channels perform data communications (IP communications) over a satellite channel. The DAMA system allocates channels as required and can deallocate and reallocate the used channels. The DAMA system thus has a feature of being able to obtain the traffic of the channels. A conventional DAMA satellite communication system having such a feature is independent of land lines, such as cell-phone lines, even in case of emergency or disaster, and thus, is generally used for disaster prevention as a system suitable for emergency communications.

CITATION LIST

Patent Literature

PTL 1: Japanese Patent Laying-Open No. 04-207822
PTL 2: Japanese Patent Laying-Open No. 2002-57720
PTL 3: Japanese Patent Laying-Open No. 2007-208630

SUMMARY OF INVENTION

Technical Problem

Conventional packet data communications over satellite channels employ a method in which terminals in the same subnet (in the layer 2 network) continuously transfer packet data to all the opposite earth stations, and unnecessary packet data is discarded between the earth stations which have received the packet data. However, when satellite channels have fewer bands or when satellite channels have low speed (e.g., in communications using spread spectrum), the bands of the satellite channels become narrower due to continuous transfer of packet data to opposite earth stations which do not need to receive packet data. As described above, the conventional packet data communications over satellite channels fail to provide a transmission speed sufficient for a communication user or may impede other communications.

The present disclosure has been made to solve the above problem and relates to a data communication method, a HUB station, and an earth station capable of restraining useless transmission of packet data using a L2 address.

Solution to Problem

A data communication method according to the present disclosure is a data communication method of performing packet data communications between a plurality of earth stations in a same subnet over a communication channel via a satellite. The method includes: a L2 address transmission step of transmitting, by a first earth station of the earth stations, a L2 address of a source to a second earth station of the earth stations; a L2 address storage step of storing, by the second earth station, the L2 address in a L2 address management table in association with the first earth station that has transmitted the L2 address of the source; and a data transmission step of reading, by the second earth station, a L2 address of a destination from destination packet data that is packet data including the L2 address of the destination, and transmitting, by the second earth station, the destination packet data to the associated earth station with reference to the L2 address management table.

A HUB station according to the present disclosure is a HUB station for data communications in which a plurality of earth stations in a same subnet perform packet data communications over a communication channel via a satellite. The HUB station includes: a L2 address storage to store a L2 address of a source read from source packet data by a first earth station of the earth stations in a L2 address management table in association with the first earth station that has transmitted the source packet data, the source packet data being packet data including a L2 address of the first earth station; and a HUB station transceiver to receive the source packet data transmitted from the first earth station, read a L2 address of a destination from destination packet data, and with reference to the L2 address management table, transmit the destination packet data to the associated earth station.

An earth station according to the present disclosure is a first earth station of a plurality of earth stations that perform packet data communications in a same subnet over a communication channel via a satellite. The earth station includes: a L2 address storage to store a L2 address of a source read from source packet data by a second earth station of the earth stations in a L2 address management table in association with the second earth station that has transmitted the source packet data, the source packet data being packet data including a L2 address of the second earth station; and a transceiver to receive the source packet data transmitted from the second earth station, read a L2 address of a destination from destination packet data, and with reference to the L2 address management table, transmit the destination packet data to the associated earth station.

An earth station according to the present disclosure is a first earth station of a plurality of earth stations that perform packet data communications in a same subnet over a communication channel via a satellite. The earth station includes: an earth station transceiver to transmit, to a second earth station of the earth stations, source packet data that is packet data including a L2 address of the earth station, which is also a L2 address of a communication terminal connected to the earth station, and receive destination packet data transmitted from the second earth station, the destination packet data being packet data including a L2 address of a destination; and a L2 address validation device to read the L2 address of the destination from the destination packet data, and when the L2 address is not the L2 address of the earth station, discard the destination packet data.

Advantageous Effects of Invention

The present disclosure can thus achieve a data communication method, a HUB station, and an earth station that can use a L2 address management table to reduce transmission (transfer) of unnecessary packet data.

DESCRIPTION OF EMBODIMENTS

Embodiment 1

A communication system, a communication method (data communication method), a HUB station, and a receiving station according to Embodiment 1 of the present disclosure will now be described with reference to FIGS. 1 to 6. In the drawings, like reference signs designate like or corresponding parts, detailed description of which will not be repeated. The communication system according to Embodiment 1 is suitable for a DAMA satellite communication system. Description will be given to the DAMA satellite communication system by way of example. The communication system according to Embodiment 1 has a plurality of communication stations 1, which include a HUB station 11 (hub station) and earth stations 12, a satellite 2 (satellite station 2), and a control station 3. Communication terminals 4 (a HUB station communication terminal 4a and communication terminals 4b) individually connected to HUB station 11 and earth stations 12 may be included in the communication system according to Embodiment 1. Each earth station 12 performs packet data communications (packet data transmission and reception) via HUB station 11 over a communication channel 5. HUB station 11 may be also referred to as primary station 11 or relay station 11. Also, earth station 12 may be a transmitting station 12 or receiving station 12 in packet data communications. In the present application, HUB station 11 may function as earth station 12, not as HUB. That is to say, earth stations 12 may exchange their L2 addresses (L2 addresses of communication terminals 4 connected thereto). Needless to say, earth station 12 may be HUB station 11. In this case, another earth station 12 will perform packet data communications via HUB station 11 in the same subnet over communication channel 5.

In FIGS. 1 to 6, in control station 3, a DAMA control unit 31 receives a request for allocation of channel of a satellite communication system via a control channel modem 32 from communication station 1 over a control channel 33 via satellite 2. DAMA control unit 31 notifies, over control channel 33, communication station 1 of an allocated communication channel 5 allocated to communication station 1. Packet data communications are performed via HUB station 11 between earth stations 12 of communication stations 1 to which the respective channels are allocated. HUB station 11 transfers packet data communications via satellite 2 to earth stations 12 among communication stations 1. Control channel 33 is a channel for requesting allocation of a communication channel, and accordingly, is also referred to as CSC channel 33. CSC means common signaling channel.

In FIGS. 1 to 6, HUB station 11 has a HUB station transceiver unit 13 (transceiver unit 13), a L2 address storage unit 14 (storage unit 14), a communication modem 15 (modem 15), a satellite GW 16 (satellite gateway 16), and a HUB station control unit 17. HUB station control unit 17 controls HUB station transceiver unit 13 (transceiver unit 13) and L2 address storage unit 14. HUB station control unit 17 controls an operation as communication station 1 (requesting allocation of a channel of the satellite communication system) and an operation as HUB station 11. Earth station 12 has an earth station control unit 18 (earth station transceiver unit 18), a L2 address validation unit 19 (validation unit 19), a communication modem 20 (modem 20), a satellite GW 21 (satellite gateway 21), and an earth station control unit 22 (earth station 12 side). Earth station control unit 22 controls earth station control unit 18 (earth station transceiver unit 18) and L2 address validation unit 19 (validation unit 19). Earth station control unit 22 controls an operation as communication station 1 (requesting allocation of a channel of the satellite communication system) and an operation as earth station 12.

Figure 1:
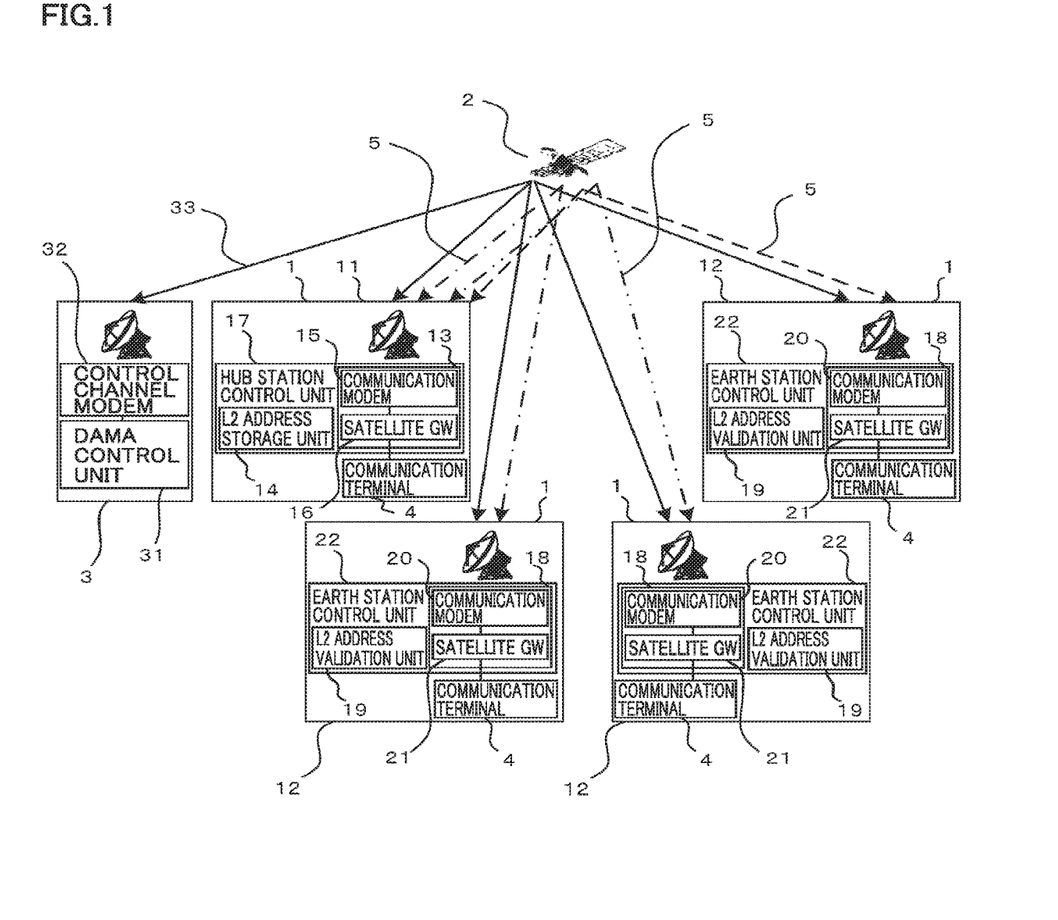
FIG. 1 is a functional block diagram of a communication system according to Embodiment 1 of the present disclosure.
Figure 2:
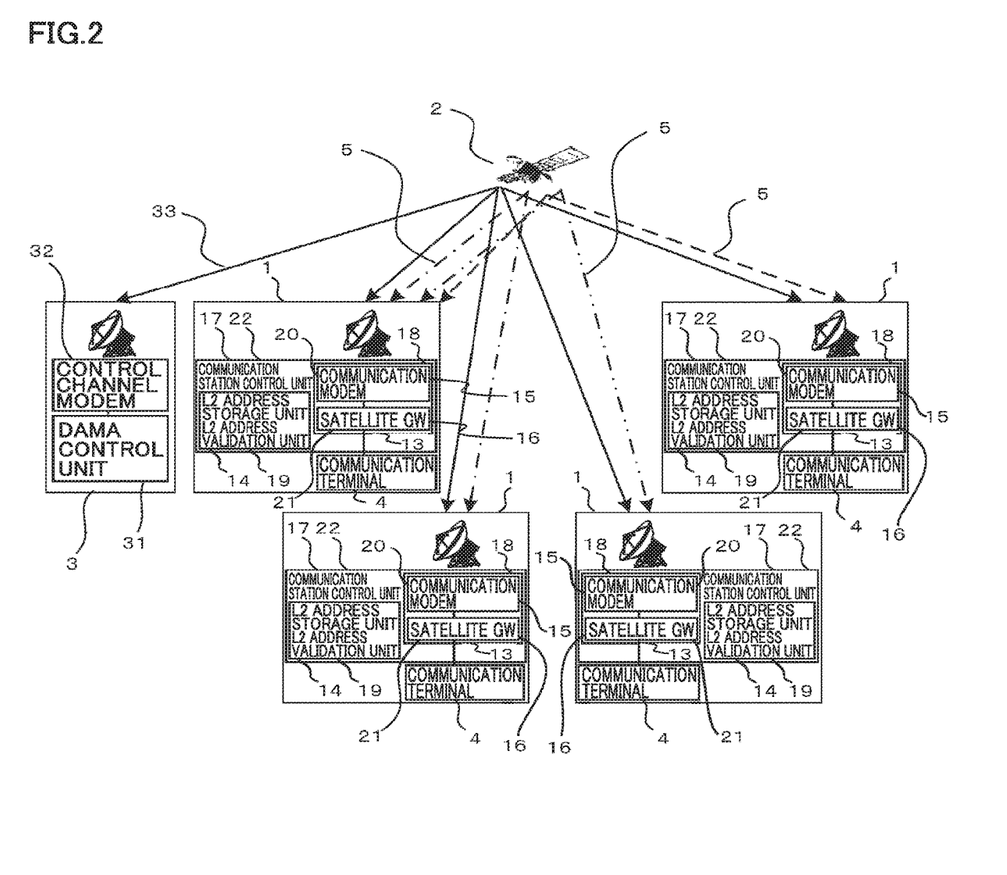
FIG. 2 is a functional block diagram (variation) of the communication system according to Embodiment 1 of the present invention disclosure.

The functional block diagram of the communication system according to Embodiment 1 shown in FIG. 2 is a variation of the functional block shown in FIG. 1. FIG. 2 illustrates the case where communication station 1 has the functions of both of HUB station 11 (hub station) and earth station 12. That is to say, in this case, the transceiver unit has the functions of HUB station transceiver unit 13 and earth station transceiver unit 18. The communication modem has functions of communication modem 15 and communication modem 20. Satellite GW (satellite gateway) has the functions of satellite GW 16 and satellite GW 21. The communication station control unit (control unit) has the functions of HUB station control unit 17 and earth station control unit 22. L2 address storage unit 14 and L2 address validation unit 19 may be provided integrally as shown in FIG. 2 or separately. In FIG. 2, the functions of L2 address storage unit 14 and L2 address validation unit 19 are shown separately from the function of satellite GW. That is to say, L2 address storage unit 14 may be provided in satellite GW 16 (satellite GW 21) that functions as a gateway into communication channel 5. Similarly, L2 address validation unit 19 may be provided in satellite GW 21 (satellite GW 16) that functions as a gateway into a communication channel.

Figure 3:
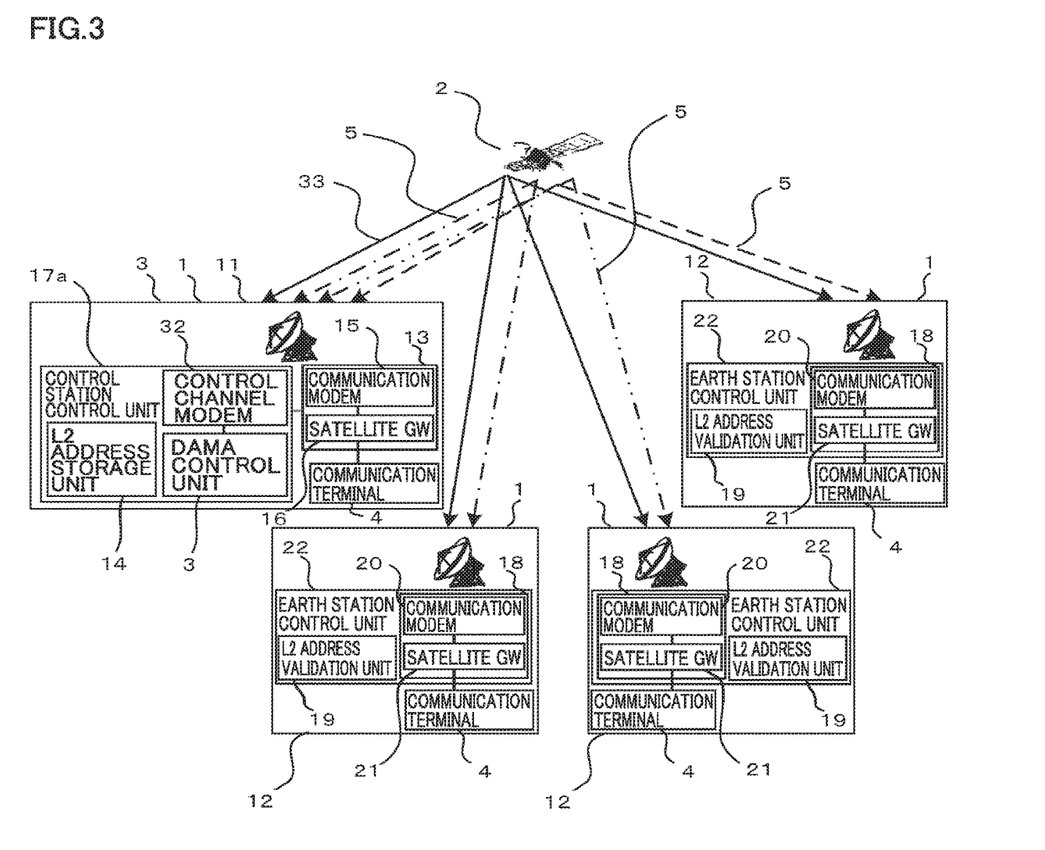
FIG. 3 is a functional block diagram (variation) of the communication system according to Embodiment 1 of the present disclosure.

Similarly, the functional block diagram of the communication system according to Embodiment 1 shown in FIG. 3 is a variation of the functional block diagram shown in FIG.

1. FIG. 3 illustrates a case where control station 3 has the function of communication station 1 (HUB station 11). That is to say, it is regarded that in HUB station 11 in this case, a control station control unit 17a has the function of HUB station control unit 17, as well as the function of control station 3. Although the case where control station 3 has the function of earth station 12 is not illustrated, it is regarded that in earth station 12 in this case, a control station control unit 18a has the function of earth station control unit 18, as well as the function of control station 3. The functional block having a combination of the functional block diagram shown in FIG. 2 and the functional block diagram shown in FIG. 3 will not be illustrated. Embodiment 1 will mainly describe the functional block diagram shown in FIG. 1.

HUB station 11 performs data communications in which earth stations 12 in the same subnet (layer 2 network) perform packet communications over communication channel 5 via satellite 2. L2 address storage unit 14 stores a L2 address of a source, which is read by earth station 12 from source packet data that is packet data including a L2 address of earth station 12, in a L2 address management table 141 in association with earth station 12 that has transmitted source packet data. Source packet data is packet data that triggers the storage operation (L2 address storage step) of L2 address storage unit 14. It is regarded that HUB station 11 has learned the L2 address of earth station 12 (communication terminal 4b). The L2 address of earth station 12 is the L2 address of communication terminal 4b connected to earth station 12. Thus, the L2 address of communication terminal 4b changes when communication terminal 4b connected to earth station 12 changes to another terminal, and accordingly, the L2 address of earth station 12 also changes. Further, when multiple communication terminals 4b are connected to earth station 12, multiple L2 addresses are provided.

HUB station transceiver unit 13 receives the source packet data transmitted from earth station 12, reads a L2 address of a destination from destination packet data, and with reference to L2 address management table 141, transmits the destination packet data to earth station 12 that is associated with the L2 address. The destination packet data is packet data that triggers the transmission operation (L2 address transmission step) of HUB station transceiver unit 13. The L2 address of the destination is also the L2 address of communication terminal 4b connected to earth station 12. The L2 address of communication terminal 4b thus changes, and accordingly, the L2 address of earth station 12 changes as well. Further, when multiple communication terminals 4b are connected to earth station 12, multiple L2 addresses are also provided.

HUB station transceiver unit 13 is connected with communication terminal 4 (HUB station communication terminal 4a). Communication terminal 4 (HUB station communication terminal 4a) generates, receives, and transmits packet data. HUB station transceiver unit 13 has communication modem 15 (modem 15) and satellite GW 16 (satellite gateway 16). Communication modem 15 (modem 15) is connected to an antenna of HUB station 11 and transmits and receives (transfers) packet data (source packet data, destination packet data) over communication channel 5 (satellite channel 5). Satellite GW 16 bridges packet data between modem 15 and HUB station communication terminal 4a and sorts packet data to an appropriate communication channel 5, that is, serves as a gateway into communication channel 5 (satellite channel 5). In FIGS. 1 and 3, the function of L2 address storage unit 14 is shown separately from the function of satellite GW 16 as in FIG. 2. That is to say, L2 address storage unit 14 may be provided in satellite GW 16 that functions as a gateway into communication channel 5.

Earth station 12 is one of earth stations 12 that perform packet communications via HUB station 11 in the same subnet (layer 2 network) over communication channel 5 via satellite 2. Earth stations 12 (transmitting station 12, receiving station 12) include n earth stations including earth station 121, earth station 122, . . . , earth station 12n-1, and earth station 12n, where n is a positive integer. The case where n=3 will be described in the present application by way of example. Earth station control unit 18 is connected with communication terminal 4 (communication terminal 4b). Earth station control unit 18 has communication modem 20 (modem 20) and satellite GW 21 (satellite gateway 21). Communication modem 20 (modem 20) is connected to an antenna of earth station 12 and transmits and receives packet data (source packet data, destination packet data) via HUB 11 over communication channel 5 (satellite channel 5). In FIGS. 1 to 4, communication channel 5 (satellite channel 5) indicated by the dot-dash line is a channel allocated between HUB station 11 and earth station 121. Communication channel 5 (satellite channel 5) indicated by the chain double-dashed line is a channel allocated between HUB station 11 and earth station 122. Communication channel 5 (satellite channel 5) indicated by the dashed line is a channel allocated between HUB station 11 and earth station 123.

Earth station transceiver unit 18 transmits, to HUB station 11, source packet data that is packet data including a L2 address of its earth station 12, which is also a L2 address of communication terminal 4b connected to its earth station 12, and receive destination packet data that is packet data including a L2 address of a destination, which is transmitted from HUB station 11. L2 address validation unit 19 reads the L2 address of the destination from the destination packet data and, when the L2 address is not the L2 address of its earth station 12, discards the destination packet data. As described above, multiple L2 addresses are also provided when multiple communication terminals 4b are connected to earth station 12, and accordingly, L2 address validation unit 19 also performs validation assuming that multiple L2 addresses of its earth station 12 are provided.

The channel allocation in the communication system (communication method) according to Embodiment 1 will be described with reference to FIGS. 1 and 3. Communication station 1 transmits a request for channel allocation over control channel 33 to control station 3. As described above, control station 3 receives the request for channel allocation of the satellite communication system from communication station 1 over control channel 33. Control station 3 notifies communication station 1 of communication channel 5 that has been allocated (channel allocation step). Next, the communication method (data communication method according to Embodiment 1) in the communication system according to Embodiment 1 after the channel allocation will be described with reference to FIGS. 4 to 6.

Figure 4:
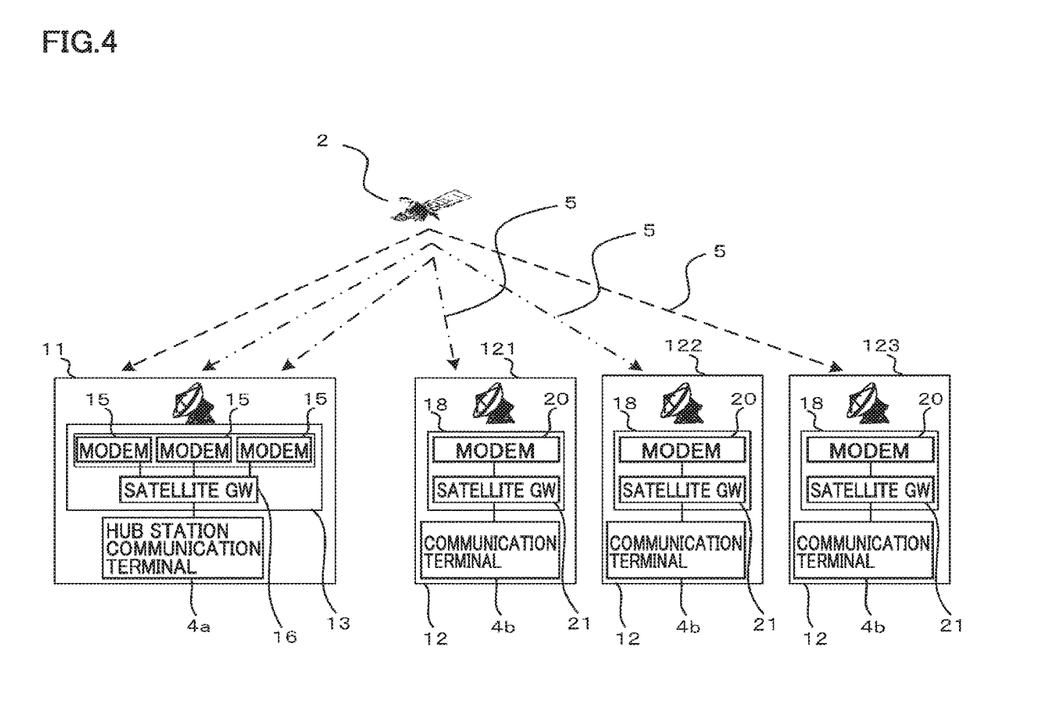
FIG. 4 is a functional block diagram (after the allocation of channels) of the communication system according to Embodiment 1 of the present disclosure.
Figure 5:
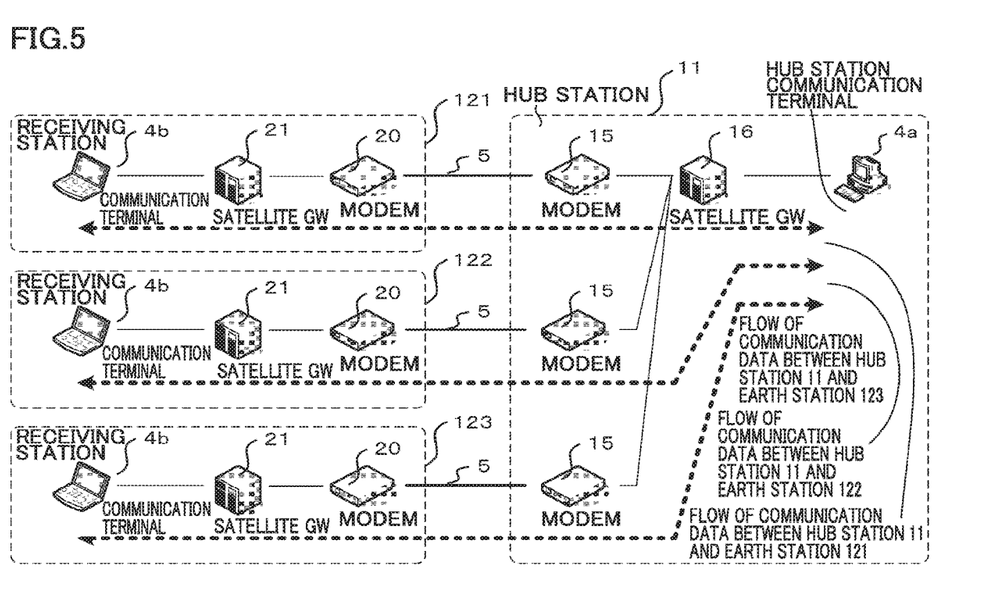
FIG. 5 is a functional block diagram (after allocation of channels) of the communication system according to Embodiment 1 of the present disclosure.

HUB station 11 shown in FIGS. 4 and 5 is connected with HUB station communication terminal 4a that performs the packet data transfer process (the process of transferring (transmitting) received source packet data as destination packet data). HUB station communication terminal 4a may be part of HUB station 11. Modem 15 is provided for each of earth station 121, earth station 122, and earth station 123 for transmission and reception of data to and from satellite 2. Satellite GW 16 sorts transmission data to appropriate communication channel 5 (satellite channel 5). Earth station 12 (earth station 121, earth station 122, earth station 123) shown in FIGS. 4 and 5 is connected with communication terminal 4b that performs the transmission process of packet data (source packet data) and the reception process of packet data (destination packet data). Communication terminal 4b may be part of earth station 12. Modem 20 transmits and receives packet data to and from satellite 2. Satellite GW 21 transfers the received data (destination packet data) to communication terminal 4b. When communication terminal 4b performs packet data communications over communication channel 5 (satellite channel 5), satellite GW 21 serves as a gateway of the satellite GW for transmitting packet data to another earth station 12 via HUB station transceiver unit 13. That is to say, satellite GW 21 bridges packet data between modem 20 and communication terminal 4b and sorts packet data to an appropriate communication channel 5, that is, functions as a gateway into communication channel 5 (satellite channel 5). The function of L2 address validation unit 19 is shown separately from the function of satellite GW 21 in FIGS. 1 and 3 as in FIG. 2. In other words, L2 address validation unit 19 may be provided in satellite GW 21 that functions as a gateway into a communication channel. The dashed lines shown in FIG. 5 indicate bidirectional flows of communication data (packet data) between HUB station 11 and three earth stations, namely, earth station 121, earth station 122, and earth station 123.

Figure 6:
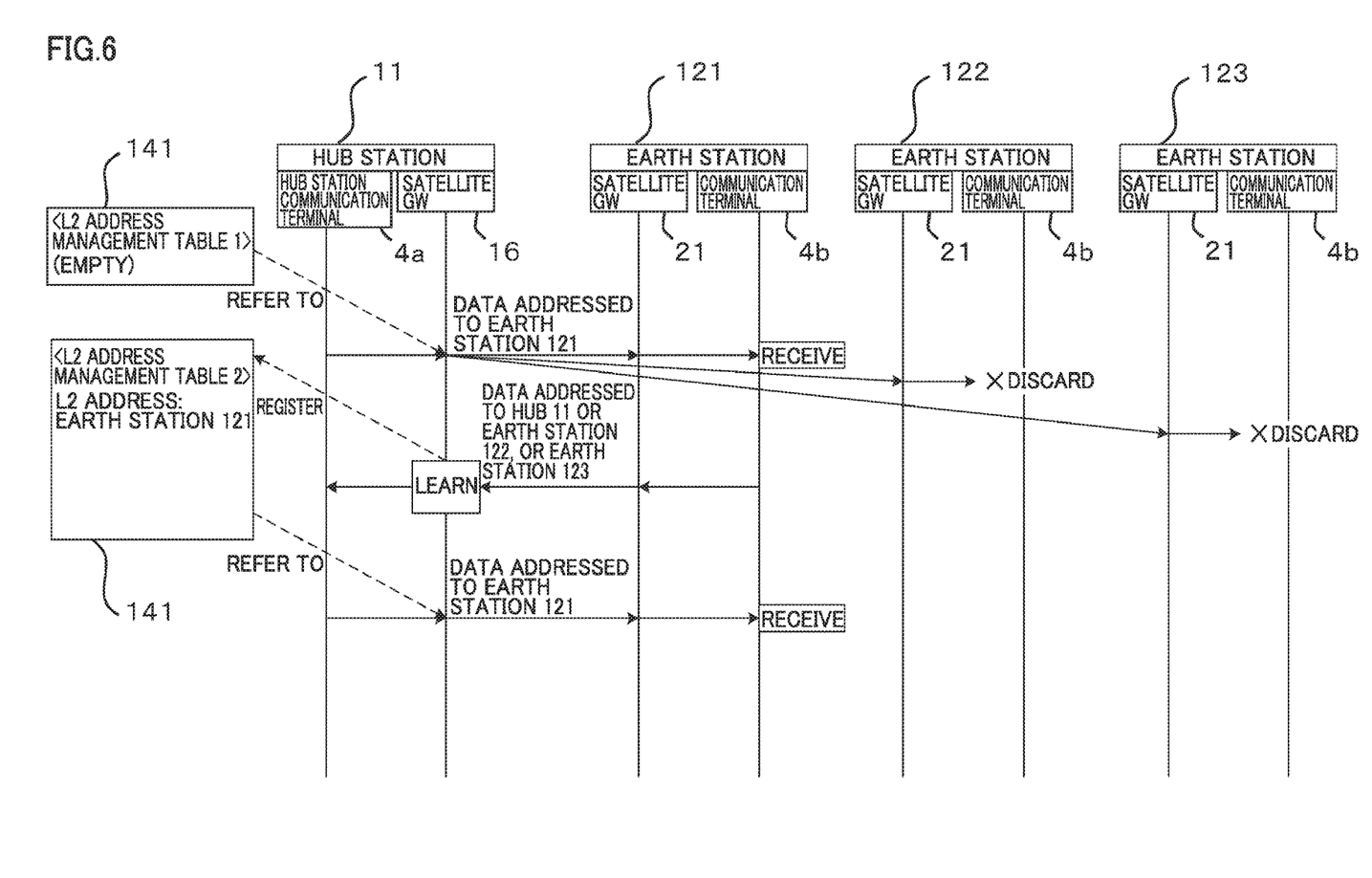
FIG. 6 shows an example sequence of the communication system according to Embodiment 1 of the present disclosure.

The example sequence of the data communication method according to Embodiment 1 is as shown in FIG. 6, that is, an example sequence in which packet data communications are performed via HUB station 11 between earth stations 12 in the same subnet over communication channel 5 via satellite 2. The data communication method according to Embodiment 1 has a L2 address transmission step, a L2 address storage step, and a data transmission step. The L2 address transmission step of the data communication method according to Embodiment 1 is the step of transmitting, by earth station 12, a L2 address of a source to HUB station 11. The L2 address storage step of the data communication method according to Embodiment 1 is the step of storing, by HUB station 11, the L2 address in L2 address management table 141 in association with earth station 12 that has transmitted the L2 address of the source.

The data transmission step of the data communication method according to Embodiment 1 is the step of reading, by HUB station 11, a L2 address of a destination from destination packet data that is packet data including the L2 address of the destination, and transmitting (transferring), by HUB station 11, the destination packet data to the associated earth station 12 with reference to L2 address management table 141. The data transmission step is also the step of transmitting, by HUB station transceiver unit 13, destination packet data to all earth stations 12 connected to communication channel 5 in the absence of earth station 12 associated in L2 address management table 141. It suffices that the data transmission step transmits destination packet data to all earth stations 12 connected to communication channel 5 without referring to L2 address management table 141 when this step is performed with no earth station 12 having performed the L2 address transmission step. This is because the L2 address is not stored in L2 address management table 141 when the data transmission step is performed before the L2 address transmission step.

The L2 address transmission step transmits, by earth station 12, source packet data that is the packet data including its L2 address (the L2 address of communication terminal 4b connected to earth station 12) to HUB station 11, and the L2 address storage step reads the L2 address from the source packet data and associates the L2 address with earth station 12 that has transmitted the source packet data. The L2 address transmission step may transmit the source packet data only for transmitting the L2 address to HUB station 11, or transmit the source packet data together in the communications for transmitting packet data to another earth station 12 via HUB station 11. When the source packet data is transmitted together in the communications for transmitting packet data to another earth station 12, it is regarded that the source packet data is destination packet data. In this case, the packet data includes the L2 address of the source and the L2 address of the destination.

Also, the L2 address transmission step is performed at least after the establishment of communication channel 5 between HUB station 11 and earth stations 12 via satellite 2. That is to say, earth station control unit 18 transmits the L2 address (source packet data) of the source at least after the establishment of communication channel 5 with HUB station 11 via satellite 2. Similarly, HUB station transceiver unit 13 receives the L2 address (source packet data) of the source at least after the establishment of communication channel 5 with earth station 12 via satellite 2. In this case, earth station control unit 18 transmits the L2 address (source packet data) of the source in the initial communications after the establishment of communication channel 5. Similarly, HUB station transceiver unit 13 receives the L2 address (source packet data) of the source in the initial communications after the establishment of communication channel 5. Although transmission of unnecessary packet data can be reduced immediately after the establishment of communication channel 5 by performing the L2 address transmission step in the initial communications after the establishment of communication channel 5, for example, in consideration of the number of earth stations 12, the L2 address transmission step may be performed on a reduced number of earth stations 12 in the initial communications. As described above, the L2 address transmission step may be performed together in the communications for transmitting packet data to another earth station 12.

The data communication method according to Embodiment 1 may further include a reception step of receiving, by earth station 12, destination packet data after the data transmission step. The data reception step is the step of receiving, by earth station transceiver unit 18, the destination packet data transmitted from HUB station 11 and reading, by L2 address validation unit 19, the L2 address of the destination and discarding the L2 address when the L2 address is not addressed to its earth station. When multiple communication terminals 4b are connected to earth station 12, multiple L2 addresses are provided as described above, and thus, the reception step is also performed assuming that multiple L2 addresses of its earth station are provided. To earth station 12 that has performed the L2 address transmission step among earth stations 12, packet data (destination packet data) addressed to any other earth station 12 is not transmitted (transferred) from HUB station 11, and accordingly, the function of L2 address validation unit 19 may be stopped. In this case, the data reception step is regarded as the step of stopping the determination of whether to discard the destination packet data through the reading of the L2 address of the destination from the destination packet data, after the L2 address transmission step. L2 address validation unit 19 stops the determination of whether to discard the destination packet data through the reading of the L2 address of the destination from the destination packet data that has been received by earth station transceiver unit 18, after earth station transceiver unit 18 has transmitted source packet data to HUB station 11. In this case, stopping the determination includes both the case where reading of the L2 address of the destination is stopped per se and the case where discarding is not determined though reading of the L2 address of the destination is performed. In an alternative configuration, L2 address validation unit 19 may not be implemented in earth station 12, and due to the absence of communication terminal 4b of the destination as in a conventional case, destination packet data may be discarded in earth station 12. That is to say, the data reception step can be performed even in the absence of L2 address validation unit 19.

Although description has been given to the components of the functional block diagram shown in FIG. 1, the data communication method, the HUB station, and the earth station according to Embodiment 1 may have components of the functional block diagram shown in FIG. 2, as described above. That is to say, communication stations 1 do not need to be operated separately for each of HUB station 11 and earth station 12. It suffices that one of earth stations 12 that perform packet data communications in the same subnet over communication channel 5 has L2 address storage unit 14 and transceiver unit 13. Similarly, the data communication method is a method of performing packet data communications between earth stations 12 in the same subnet over communication channel 5. L2 address storage unit 14 stores a L2 address of a source, which is read by another earth station 12 from source packet data that is the packet data including the address of its earth station, in the L2 address management table in association with the other earth station 12 that has transmitted the source packet data. Transceiver unit 13 receives the source packet data transmitted from the other earth station 12, read the L2 address of the destination from the destination packet data, and with reference to L2 address management table 141, transmit the destination packet data to the associated earth station 12.

The data communication method according to Embodiment 1 may include the data reception step, as well as the channel allocation step described above. Alternatively, the data communication method according to Embodiment 1 may include no data reception step and include only the channel allocation step. It has been described that the L2 address of communication terminal 4b changes when communication terminal 4b connected to earth station 12 changes to another terminal, and accordingly, the L2 address of earth station 12 changes as well. Such a case will be described in Embodiment 2. It is regarded that HUB station 11 relearns the L2 address of earth station 12 (communication terminal 4b). Note that also in the data communication method according to Embodiment 2, the relation between the channel allocation step and the data reception step is similar to that of the data communication method according to Embodiment 1.

The data communication method according to Embodiment 1 will be described more specifically with reference to FIG. 6. As shown in FIG. 6, HUB station communication terminal 4a connected to HUB station 11 and communication terminal 4b of each of earth station 121, earth station 122, and earth station 123 enable packet data communications in the same subnet over a communication channel. FIG. 6 illustrates the relation between earth stations 12 and HUB station 11 that enables packet data communications, which will not show communication channel 5.

The procedure of the data communication method according to Embodiment 1 shown in FIG. 6 will be described. Satellite GW 16 of HUB station 11 manages L2 address management table 141 and has the function of transferring packet data to modem 15 in HUB station 11 in accordance with the content of the table. The correspondence between a L2 address that is the destination of the destination packet data obtained from the source packet data and earth station 12 (earth station 121, earth station 122, earth station 123) in which communication terminal 4b with the L2 address is installed is written in L2 address management table 141. As illustrated in <L2 ADDRESS MANAGEMENT TABLE 1>, nothing is registered in the initial state. Thus, as shown in FIG. 6, HUB station 11 has no information on the L2 address of earth station 121 in the initial state even when the packet data addressed to earth station 121 (strictly speaking, addressed to communication terminal 4b connected to earth station 121) is transmitted from HUB station 11 or transmitted via HUB station 11, and accordingly, packet data is transmitted to all earth stations 12. Earth station 122 and earth station 123 excluding earth station 121 receive the packet data addressed to earth station 121 and then discard the received packet data.

In earth station 12 (earth station 121, earth station 122, earth station 123) that is opposite to HUB station 11, when packet data (packet data addressed to HUB station 11, addressed to another earth station 12 via HUB station 11) is transmitted from communication terminal 4b, satellite GW 21 of earth station 12 transfers the packet data to the HUB station 11 side over communication channel 5 via modem 20. The L2 address of communication terminal 4b is described as the source L2 address in this packet data. FIG. 6 shows the state in which packet data is transferred from communication terminal 4b connected to earth station 121 and satellite GW 16 on the HUB station 11 side learns the packet data. Upon receipt of the packet data transferred over communication channel 5, satellite GW 16 on the HUB station 11 side reads the source L2 address written in the packet data and registers the relevant earth station 12 in L2 address management table 141 as illustrated in <L2 ADDRESS MANAGEMENT TABLE 2>.

When HUB station communication terminal 4a of HUB station 11 transmits packet data addressed to earth station 121 from HUB station 11 or transmits via HUB station 11, earth station 121 is associated if <L2 ADDRESS MANAGEMENT TABLE 2> is illustrated, and thus, HUB station communication terminal 4a does not need to transmit packet data to all earth stations 12. In transmission of packet data, satellite GW 16 of HUB station 11 reads a destination L2 address from the packet data and retrieves the destination L2 address from L2 address management table 141. When the correspondence between the destination L2 address and earth station 12 is registered in L2 address management table 141, the packet data is transferred only to this earth station 12 and is not transferred to any other earth station 12. When the correspondence between the destination L2 address and earth station 12 is not registered in L2 address management table 141, the packet data is transferred to all earth stations 12 connected with communication channel 5 at that time.

As described above, it is regarded that the data communication method, the HUB station, and the earth station according to Embodiment 1 relate to the packet transfer scheme through learning of a L2 address in packet data communications in the same subnet (layer 2 network) over satellite channel 5 by the satellite communication system. Since the disclosure according to Embodiment 1 restricts a transfer destination of packet data on the HUB station 11 or earth station 12 side in accordance with the reception of the packet data from the earth station 12 side, an amount of packet data transferred to satellite channel 5 can be reduced, leading to increased use efficiency of satellite channel 5. Specifically, transfer or transmission of packet data, transfer of which is not required, to earth station 12 can be minimized, leading to effective use of the band of satellite channel 5. Also, it is regarded that a transmission amount is restricted (a band is effectively used) through learning of a L2 address in the configuration in which earth stations 12 are connected in the same subnet (layer 2).

Embodiment 2

Figure 7:
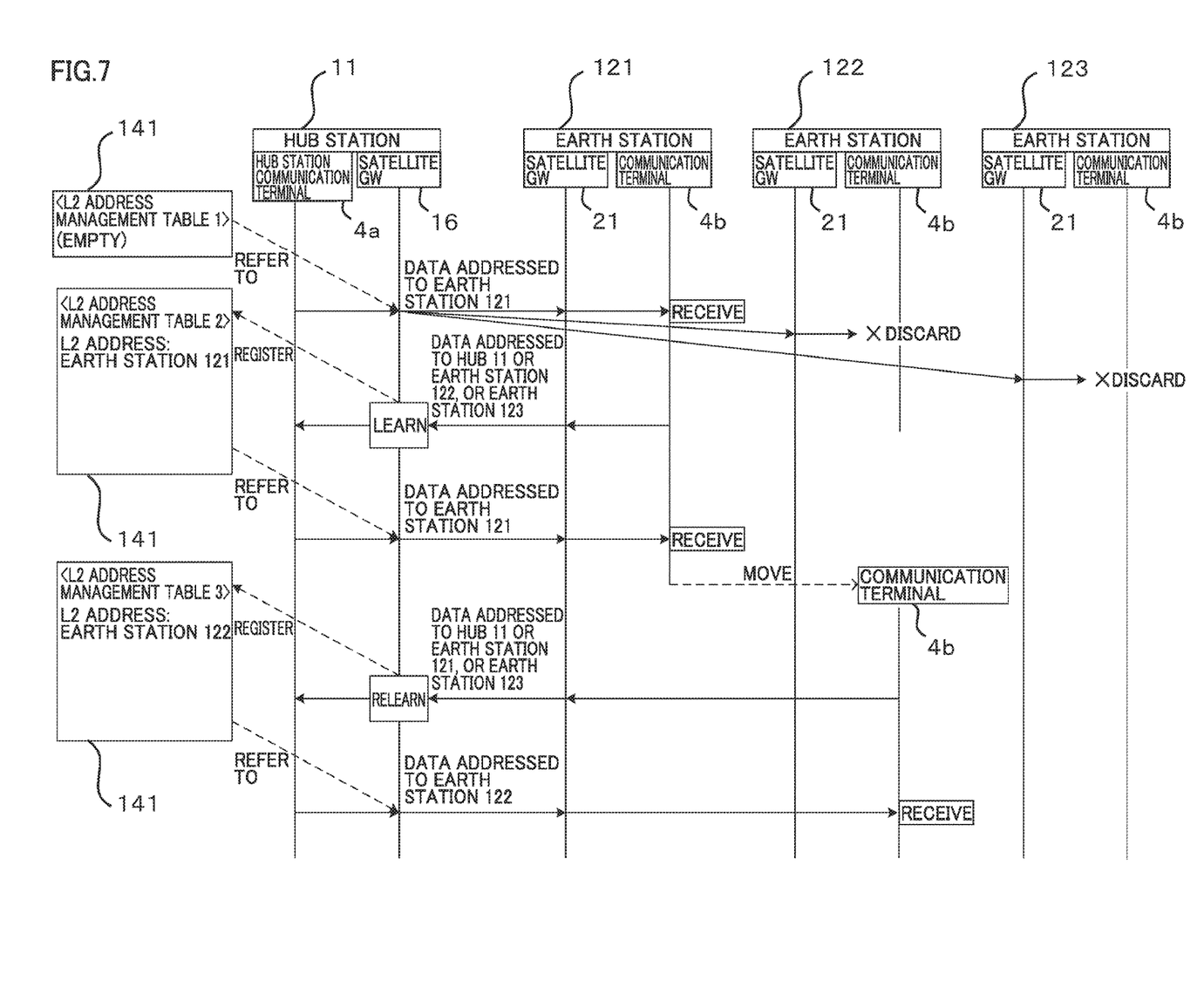
FIG. 7 shows an example sequence of a communication system according to Embodiment 2 of the present invention disclosure.

A data communication method, a HUB station, and an earth station according to Embodiment 2 of the present disclosure will be described with reference to FIG. 7. In the figure, the same references denote the same or corresponding parts, detailed description of which will be omitted. Embodiments 1 and 2 are common in the following respects. Satellite GW 16 (L2 address storage unit 14) of HUB station 11 manages L2 address management table 141. In L2 address management table 1411, a L2 address of earth station 12 that serves as a destination is written, and no earth station 12 is registered in the initial state. Although Embodiment 2 will also mainly describe the components of the functional block shown in FIG. 1, the data communication method, the HUB station, and the earth station according to Embodiment 2 may be the components shown in the functional block diagram shown in FIG. 2 or the functional block diagram shown in FIG. 3.

Differences between Embodiments 1 and 2 will be mainly described. The parts that will not be described are common in Embodiments 1 and 2. In Embodiment 2, HUB station 11 relearns the L2 address of earth station 12a (communication terminal 4b). The other parts are essentially common between Embodiments 1 and 2. It is regarded that Embodiment 2 will describe the correspondence when communication terminal 4b connected to earth station 12 changes to another terminal and the L2 address of communication terminal 4b changes.

The data communication method according to Embodiment 2 will be specifically described with reference to FIG. 7. FIG. 7 differs from FIG. 6 used in the description of Embodiment 1 in that communication terminal 4b connected to earth station 121 moves to earth station 122 in FIG. 7. The operations until this point are common between FIGS. 6 and 7, which will not be repeated. In Embodiment 2, when a L2 address of a source read from the source packet data is transmitted from another earth station 12 different from earth station 12 associated with the L2 address in L2 address management table 141, L2 address storage unit 14 associates anew the L2 address with the other earth station 12 to update L2 address management table 141. When communication terminal 4b connected to its earth station is changed, L2 address validation unit 19 determines whether to discard the destination packet data with the changed L2 address as the L2 address of its earth station.

The procedure of the data communication method according to Embodiment 2 shown in FIG. 7 will be described. When packet data (packet data addressed to HUB station 11, addressed to another earth station 12 via HUB station 11) is transmitted from communication terminal 4b connected to earth station 122 after communication terminal 4b connected to earth station 121 has moved to earth station 122 in earth station 12 (earth station 121, earth station 122, earth station 123) that is opposite to HUB station 11, in satellite GW 21 of earth station 12, the packet data is transferred to the HUB station 11 side over communication channel 5 via modem 20. The L2 address of communication terminal 4b is written in this packet data as a source L2 address. FIG. 7 shows the state in which packet data is transferred from communication terminal 4b connected to earth station 122, and satellite GW 16 on the HUB station 11 relearns the packet data.

Upon receipt of the packet data transferred over communication channel 5, satellite GW 16 on the HUB station 11 side reads a source L2 address written in the packet data and registers a relevant earth station 12 in L2 address management table 141 as indicated in <L2 ADDRESS MANAGEMENT TABLE 3>. That is to say, earth station 121 previously registered is deleted, and earth station 122 is registered. Of the operations in relearning, the operations other than the deletion are essentially similar to the operations of L2 address storage unit 14 (L2 address storage step) in satellite GW 16 which have been described in Embodiment 1.

That is to say, it is regarded that the L2 address storage step according to Embodiment 2 is the step of, when an L2 address associated in L2 address management table 141 is transmitted from another earth station 12 as a L2 address of a source, associating anew the L2 address with the other earth station 12 to update L2 address management table 141.

When HUB station communication terminal 4a of HUB station 11 transmits packet data addressed to earth station 122 from HUB station 11 or transmit via HUB station 11, if <L2 ADDRESS MANAGEMENT TABLE 3> is illustrated, earth station 122 is associated, and accordingly, HUB station communication terminal 4a does not need to transmit packet data to all earth stations 12. In transmission of packet data, satellite GW 16 of HUB station 11 reads a destination L2 address from packet data and retrieves the destination L2 address from L2 address management table 141. When the correspondence between destination L2 address and earth station 12 is registered in L2 address management table 141, packet data is transferred only to the relevant earth station 12 and is not transferred to any other earth station 12. When the correspondence between destination L2 address and earth station 12 is not registered in L2 address management table 141, packet data is transferred to all earth stations 12 connected with communication channel 5 at that time.

When communication terminal 4b connected to its earth station is changed, L2 address validation unit 19 may perform determination of whether to discard destination packet data with the changed L2 address as the L2 address of its earth station, as well as the following operation. After earth station transceiver unit 18 transmits, to HUB station 11, source packet data including the changed L2 address as a L2 address of its earth station, L2 address validation unit 19 may stop the determination of whether to discard the destination packet data through reading of the L2 address of the destination from destination packet data. Stopping the determination of whether to discard the destination packet data is as described in Embodiment 1.

Although the case where earth station 12 connected with communication terminal 4b is changed has been described, the data communication method, the HUB station, and the earth station according to Embodiment 2 can operate as described below even when communication terminal 4b is simply removed. When communication terminal 4b connected to earth station 121 is removed from earth station 121, satellite GW 21 in earth station 12 transfers packet data indicating the removed L2 address to the HUB station 11 side over communication channel 5 via modem 20. The L2 address of communication terminal 4b is described as a source L2 address in this packet data. Upon receipt of the packet data transferred through satellite GW 16 on the HUB station 11 side and communication channel 5, the source L2 address written in the packet data is read and is registered in address management table 141 so as to indicate that communication terminal 4b has been removed from the relevant earth station 12.

In other words, it is registered that communication terminal 4b has been removed from registered earth station 121. Even when the packet data addressed to earth station 121 (strictly speaking, addressed to communication terminal 4b connected to earth station 121) is transmitted from HUB station 11 or transmitted via HUB station 11, the information on the L2 address of earth station 121 indicates that communication terminal 4b has been removed from earth station 121, and thus, HUB station 11 does not transmit packet data to all earth stations 12, and HUB station transceiver unit 13 of HUB station 11 discards packet data. A notification that communication terminal 4b has been removed from earth station 121 may be provided to earth station 122 and earth station 123 excluding earth station 121 by transmitting packet data. This notification may be triggered by registration of removal of communication terminal 4b from earth station 121.

As described above, even when earth station 12 connected with communication terminal 4b is changed, the data communication method, the HUB station, and the earth station according to Embodiment 2 can reduce an amount of packet data transferred to satellite channel 5 to increase the use efficiency of satellite channel 5 as in Embodiment 1. Also, in Embodiment 2, after L2 address validation unit 19 (receiving step) transmits source packet data to HUB station 11 or earth station 12, any one of the following operations may be performed: the operation of stopping the determination of whether to discard destination packet data through reading of a L2 address of a destination from destination packet data, and the operation of, when communication terminal 4b connected to its station is changed, determining whether to discard destination packet data with the changed L2 address as the L2 address of its station.

As described above, when communication terminals in the same subnet (layer 2 network) perform packet data communications over a satellite channel, the data communication method, the HUB station, and the earth station according to Embodiment 1, 2 do not need to constantly transfer packet data to all opposite earth stations and discard unnecessary packet data in the earth stations that have received packet data each time. Satellite channels generally have communication bands fewer than those of communication channels within ground equipment, and the bands of the satellite channels become narrower by constantly transferring packet data to an earth station, namely, an opposite station, that does not need to receive packet data. However, the above situation can be restricted. Thus, transfer of packet data to an earth station, namely, an opposite station that does not need to receive packet data, can be minimized, leading to effective use of satellite channel bands.

REFERENCE SIGNS LIST

1: communication station (HUB station, earth station), 11: HUB station (primary station, intermediate station), 12: earth station (transmitting station, receiving station), 2: satellite (satellite station), 3: control station, 31: DAMA control unit (DAMA control device, DAMA controller), 32: control channel modem, 33: control channel (CSC channel), 4: communication terminal, 4a: HUB station communication terminal, 4b: communication terminal, 5: communication channel (satellite channel), 121-12n: earth station (transmitting station, receiving station), 13: HUB station transceiver unit (transceiver unit, HUB station transceiver, transceiver), 14: L2 address storage unit (storage unit, L2 address storage, storage), 141: L2 address management table, 15: communication modem (modem), 16: satellite GW (satellite gateway), 17: HUB station control unit (communication station control unit, control unit, HUB station control device, communication station control device, control device, communication station controller, HUB station controller), 17a: control station control unit (control station control device, control station controller), 18: earth station transceiver unit (transceiver unit, earth station transceiver, transceiver), 18a: control station control unit (control station control device, control station controller), 19: L2 address validation unit (validation unit, L2 address validation device, validation device, L2 address validation apparatus, validation apparatus), 20: communication modem (modem), 21: satellite GW (satellite gateway), 22: earth station control unit (communication station control unit, control unit, earth station control device, communication station control device, control device, communication station controller, earth station controller).

The invention claimed is:

1. A data communication method of performing packet data communications between a plurality of earth stations in a same subnet over a communication channel via a satellite, each of the plurality of earth stations having an internet protocol (IP) address and being connected with a communication terminal addressed with a layer two address assigned to the communication terminal, the IP addresses of the plurality of earth stations including a same network portion and being different from each other, the method comprising:

transmitting, by a first earth station included in the plurality of earth stations, a source packet data attached with a header including a layer two address of a source being the communication terminal connected to the first earth station to a second earth station included in the plurality of earth stations via the satellite;

storing, by the second earth station, an association between the layer two address of the source included in the header attached to the source packet data and the IP address assigned to the first earth station that has transmitted the source packet data via the satellite, in a layer two address management table;

reading, by the second earth station, a layer two address of a destination included in a header attached to a destination packet data, the destination being the communication terminal; and second transmitting, by the second earth station, the destination packet data to an associated earth station included in the plurality of earth stations via the satellite, the associated earth station being the earth station having the IP address being associated, in the layer two address management table, with the layer two address of the destination read from the header attached to the destination packet data, wherein in the absence of any of the plurality of earth stations having the IP address that is associated in the layer two address management table with the layer two address of the destination, the second transmitting includes transmitting the destination packet data to all of the plurality of earth stations connected to the communication channel via the satellite.

2. The data communication method according to claim 1, wherein when the second transmitting is performed before the transmitting, the second transmitting includes transmitting the destination packet data to all of the plurality of earth stations connected to the communication channel via the satellite.

3. The data communication method according to claim 1, further comprising
receiving by the first earth station the destination packet data transmitted from the second earth station via the satellite,
second reading by the first earth station the layer two address of the destination from the header attached to the destination packet data, and
when the layer two address is not addressed to the first earth station, discarding the destination packet data.

4. The data communication method according to claim 3, wherein after the transmitting, the receiving does not include determination whether to discard the destination packet data through the reading of the layer two address of the destination from the header attached to the destination packet data.

5. The data communication method according to claim 1, wherein the transmitting includes transmitting to the second earth station via the satellite, by the first earth station, the source packet data being attached with the header including a layer two address of the source, and the storing includes reading a layer two address from the source packet data and associates the layer two address with the IP address assigned to the first earth station that has transmitted the source packet data via the satellite.

6. The data communication method according to claim 1, wherein when the layer two address in the layer two address management table is transmitted as the layer two address of the source from a third earth station included in the plurality of earth stations via the satellite, the storing includes associating anew the layer two address with the IP address assigned to the third earth station to update the layer two address management table.

7. The data communication method according to claim 1, wherein the second earth station is a HUB station, and the packet data communications are performed via the HUB station in a same subnet over the communication channel via the satellite.

8. A HUB station for data communications in which a plurality of earth stations in a same subnet perform packet data communications over a communication channel via a satellite, each of the plurality of earth stations having an internet protocol (IP) address and being connected with a communication terminal addressed with a layer two address assigned to the communication terminal, the IP addresses of the plurality of earth stations including a same network portion and being different from each other, the HUB comprising:
a layer two address storage to store, in a layer two address management table, association between a layer two address of a source, read from a header attached to a source packet data, and an IP address assigned to a first earth station included in the plurality of earth stations that has transmitted the layer two address of the source read from the header attached to the source packet data via the satellite, the source being the communication terminal connected to the first earth station; and
a HUB station transceiver to receive the source packet data transmitted from the first earth station via the satellite, read a layer two address of a destination from a header attached to a destination packet data, and with reference to the layer two address management table, transmit via the satellite the destination packet data to an associated earth station included in the plurality of earth stations, the associated earth station being the earth station having the IP address being associated, in the layer two address management table, with the layer two address of the destination read from the header attached to the destination packet data, the destination being the communication terminal connected to the associated earth station,
wherein in the absence of any of the plurality of earth stations having the IP address that is associated in the layer two address management table with the layer two address of the destination, the HUB station transceiver transmits the destination packet data to all of the plurality of earth stations connected to the communication channel via the satellite.

9. The HUB station according to claim 8, wherein when the layer two address of the source read from the source packet data is transmitted via the satellite from a second earth station included in the plurality of earth stations that is different from the first earth station having the IP address associated in the layer two address management table, the layer two address storage associates anew the layer two address with the IP address assigned to the second earth station to update the layer two address management table.

10. The HUB station according to claim 8, wherein the layer two address storage is provided in a satellite GW that functions as a gateway into the communication channel.

11. An earth station that is a first earth station included in a plurality of earth stations that perform packet data communications in a same subnet over a communication channel via a satellite, each of the plurality of earth stations having an internet protocol (IP) address and being connected with a communication terminal addressed with a layer two address assigned to the communication terminal, the IP addresses of the plurality of earth stations including a same network portion and being different from each other, the earth station comprising:
a layer two address storage to store association between a layer two address of a source read from a header attached to a source packet data and an IP address assigned to a second earth station included in the plurality of earth stations that has transmitted the source packet data via the satellite, in a layer two address management table, the source being the communication terminal connected to the second earth station; and
a transceiver to receive the source packet data transmitted from the second earth station via the satellite, read a layer two address of a destination included in a header attached to a destination packet data, and with reference to the layer two address management table, transmit the destination packet data via the satellite to an associated earth station, the associated earth station being the earth station having the IP address being associated with the layer two address of the destination read from the header attached to the destination packet data in the layer two address management table, the destination being the communication terminal connected to the associated earth station,
wherein in the absence of any of the plurality of earth stations having the IP address that is associated in the layer two address management table with the layer two address of the destination, the transceiver transmits the destination packet data to all of the plurality of earth stations connected to the communication channel via the satellite.

12. The earth station according to claim 11, wherein when a layer two address of a source read from the destination packet data is transmitted via the satellite from a third earth station included in the plurality of earth stations that is different from the second earth station having the IP address associated in the layer two address management table, the layer two address storage associates the layer two address with the IP address assigned to the third earth station to update the layer two address management table.

13. The earth station according to claim 11, wherein the layer two address storage is provided in a satellite GW that functions as a gateway into the communication channel.

\* \* \* \* \*